(12) United States Patent
Cardamore

(10) Patent No.: US 9,904,532 B2
(45) Date of Patent: Feb. 27, 2018

(54) SYSTEM AND METHOD FOR DISTRIBUTING SOFTWARE UPDATES

(71) Applicant: 2236008 ONTARIO INC., Waterloo (CA)

(72) Inventor: Daniel Cardamore, Kanata (CA)

(73) Assignee: 2236008 ONTARIO INC., Waterloo (CA)

( * ) Notice: Subject to any disclaimer, the term of this patent is extended or adjusted under 35 U.S.C. 154(b) by 0 days.

(21) Appl. No.: 14/590,280

(22) Filed: Jan. 6, 2015

(65) Prior Publication Data

US 2015/0193223 A1 Jul. 9, 2015

Related U.S. Application Data

(60) Provisional application No. 61/923,837, filed on Jan. 6, 2014.

(51) Int. Cl.
*G06F 9/44* (2006.01)
*G06F 9/445* (2018.01)

(52) U.S. Cl.
CPC . *G06F 8/65* (2013.01); *G06F 9/44* (2013.01)

(58) Field of Classification Search
None
See application file for complete search history.

(56) References Cited

U.S. PATENT DOCUMENTS 8,719,815 B1 * 5/2014 Park ............... G06F 8/61 717/174
8,869,142 B2 * 10/2014 Gouge ............. G06F 21/51 717/169

(Continued)

FOREIGN PATENT DOCUMENTS

EP 2109041 A1 10/2009
EP 2388698 A1 11/2011

OTHER PUBLICATIONS

Office Action issued on corresponding EP application 15150208.5 dated Mar. 7, 2016.

(Continued)

*Primary Examiner* — Lewis A Bullock, Jr.
*Assistant Examiner* — Mark Gooray
(74) *Attorney, Agent, or Firm* — Gowling WLG (Canada) LLP

(57) ABSTRACT

A system and method for distributing software updates may receive one or more device states associated with the one or more devices at a service delivery platform separate from the one or more devices where each of the one or more device states includes version information. Store the one or more device states persistently. Receive a software update configuration at the service delivery platform. Receive one or more software update files at the service delivery platform associated with the software update configuration. Determine a candidate device list utilizing the software update configuration and the information contained in the one or more device states, the candidate device list containing references to one or more targeted devices, of the one or more devices, targeted to receive the software update. The software update manager may examine each of the relevant device states as specified in the software update configuration one by one.

13 Claims, 3 Drawing Sheets

(56) References Cited

U.S. PATENT DOCUMENTS

| | | | |
|---|---|---|---|
| 9,032,387 B1* | 5/2015 | Hill | G06F 8/61 |
| | | | 717/173 |
| 9,038,052 B2* | 5/2015 | Ishimoto | G06F 8/65 |
| | | | 717/169 |
| 2004/0215755 A1 | 10/2004 | O'Neill | |
| 2005/0144616 A1 | 6/2005 | Hammond et al. | |
| 2008/0005170 A1 | 1/2008 | Costanza et al. | |
| 2011/0209136 A1* | 8/2011 | Sims | G06F 8/65 |
| | | | 717/171 |
| 2011/0296393 A1* | 12/2011 | Vidal | G06F 8/453 |
| | | | 717/171 |
| 2013/0042227 A1 | 2/2013 | Little et al. | |

OTHER PUBLICATIONS

Communication under Rule 71(3) EPC (Intention to Grant) from corresponding EP application 15150208.5 dated Feb. 24, 2017.
Extended European Search Report from corresponding EP application 15150208.5 dated Apr. 23, 2015.
English Abstract of European Patent Publication No. 2109041 published Oct. 14, 2009.

* cited by examiner

200

202 — Receive one or more device states associated with the one or more devices at a service delivery platform.

204 — Store the one or more device states persistently.

206 — Receive a software update configuration at the service delivery platform.

208 — Receiving one or more software update files at the service delivery platform associate with the software update configuration.

210 — Determine a candidate device list utilizing the software update configuration and the information contained in the one or more device states, the candidate device list containing references to one or more targeted devices.

Figure 2

SYSTEM AND METHOD FOR DISTRIBUTING SOFTWARE UPDATES

CROSS-REFERENCE TO RELATED APPLICATIONS

This application claims priority from U.S. Provisional Patent Application Ser. No. 61/923,837, filed Jan. 6, 2014, the entirety of which is incorporated herein by reference.

BACKGROUND

Technical Field

The present disclosure relates to the field of distributing software updates. In particular, to a system and method for distributing software updates.

Related Art

Machine-to-machine (a.k.a. M2M) communication includes technologies that enable systems and devices to communicate with other systems and devices. The systems and devices include various types of machines that have both data handling and communications capabilities such as, for example, embedded computing devices (e.g. washing machine, automobile), sensors (e.g. thermostat) and service platforms (e.g. software update server).

The communication between the systems and devices can include, for example, the transmission of various data payloads, event notifications, signals and other forms of data transmission. One application of M2M communication that is attracting growing interest is updating software (e.g. executable object code) stored on the devices.

As the number and diversity of devices participating in distributed software updates grow, numerous challenges arise for the infrastructure providing the software update distribution capability. The challenges may include issues related to scalability, security, interoperability, intermittent connectivity and minimizing device resource requirements. Scalability issues may relate to large populations of devices both homogeneous and heterogeneous. The interoperability issues include heterogeneity of devices, devices having multiple sub-components, multiple competing standards and a lack of standardization. Intermittent connectivity may affect devices that have periodic or sporadic connectivity due to factors such as power consumption minimization, intermittent operation (e.g. frequently powered off) and loss of network coverage (in particular for wireless devices). Minimization of device resource requirement, for example when determining the applicability of software updates, may involve one or more resources related to computing capacity, memory footprint, power consumption and bandwidth consumption.

There is a need for a system and method for distributing software updates that mitigates one or more of the challenges described above.

BRIEF DESCRIPTION OF DRAWINGS

The system and method for distributing software updates may be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

Other systems, methods, features and advantages will be, or will become, apparent to one with skill in the art upon examination of the following figures and detailed description. It is intended that all such additional systems, methods, features and advantages be included with this description and be protected by the following claims.

FIG. 2 is flow diagram representing a method for distributing software updates.

DETAILED DESCRIPTION

Figure 1:
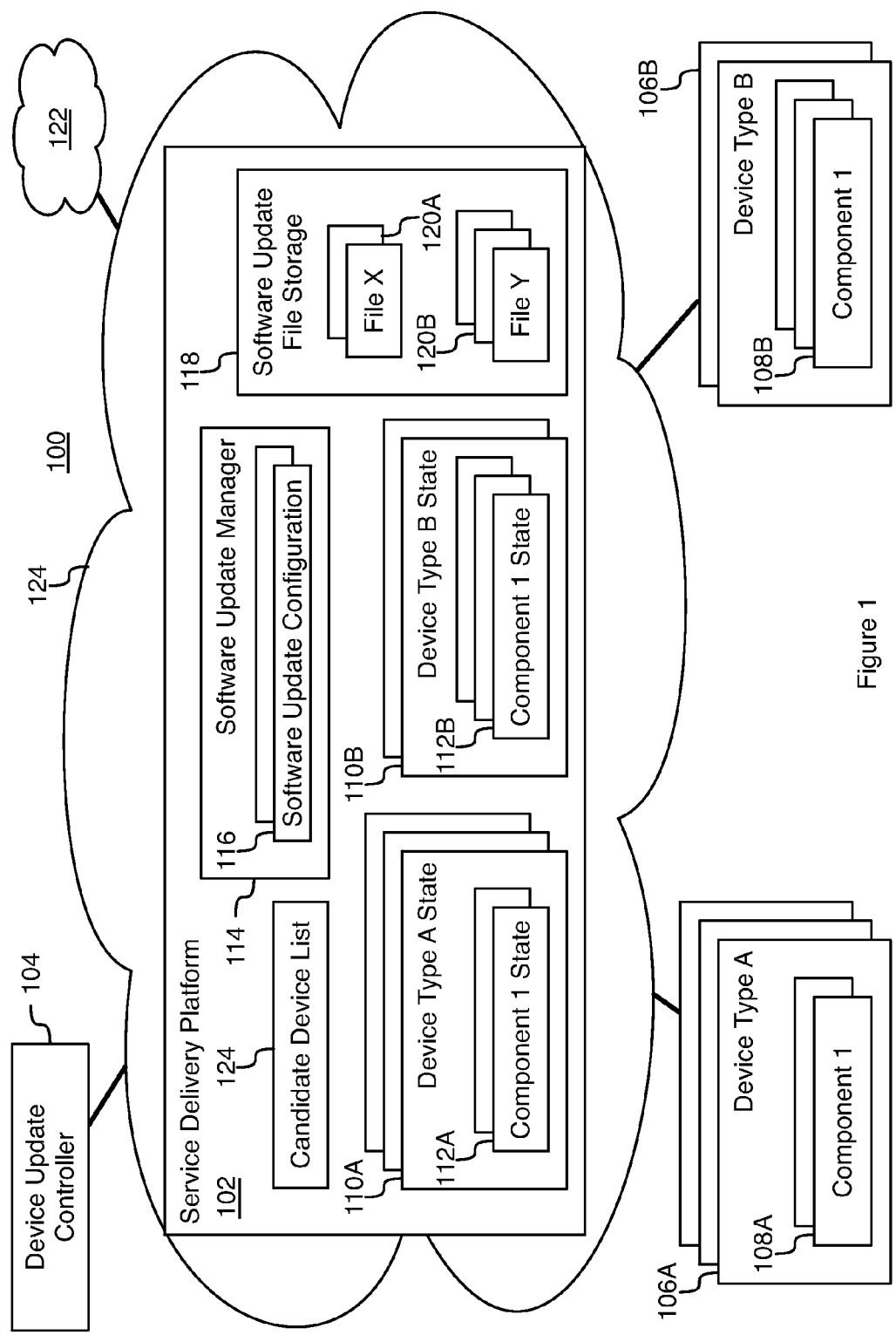
FIG. 1 is a schematic representation of a system for distributing software updates.

A system and method for distributing software updates that mitigates one or more of the challenges described above is described therein. The system and method for distributing software updates may receive one or more device states associated with the one or more devices at a service delivery platform separate from the one or more devices where each of the one or more device states includes version information. The device state may be communicated to the service delivery platform when, for example, information contained within the device state changes, the device has connectivity or the service delivery platform requests a device state update. The service delivery platform may store the one or more device states persistently. The service delivery platform may access the device states when the associated device may not have connectivity to the service delivery platform. A software update configuration may be received at the service delivery platform. A software update manager may receive the software update configuration. One or more software update files may be received at the service delivery platform associated with the software update configuration. A software update file storage may receive and store the one or more software update files. A candidate device list may be determined utilizing the software update configuration and the information contained in the one or more device states, the candidate device list containing references to one or more targeted devices, of the one or more devices, targeted to receive a software update associated with the software update configuration. The software update manager may examine each of the relevant device states as specified in the software update configuration one by one without the need for communication with each of the one or more devices. While more than one of the devices may be of the same device type or multiple devices may be similar, the software update manager may consider each device individually as they may not have identical device state information. The software update manager may determine the candidate device list without dependency on any additional computing contribution from the individual devices by examining the respective stored device state information.

In accordance with an aspect of the present disclosure there is provided a method for distributing software updates to one or more devices comprising: receiving one or more device states associated with the one or more devices at a service delivery platform separate from the one or more devices where each of the one or more device states includes version information; storing the one or more device states persistently; receiving a software update configuration at the service delivery platform; receiving one or more software update files at the service delivery platform associated with the software update configuration; and determining a candidate device list utilizing the software update configuration and the information contained in the one or more device states, the candidate device list containing references to one or more targeted devices, of the one or more devices, targeted to receive a software update associated with the software update configuration.

In accordance with another aspect of the present disclosure there is provided a system for distributing software updates to one or more devices comprising: a service delivery platform to receive one or more device states associated with the one or more devices at the service delivery platform separate from the one or more devices where each of the one or more device states includes version information; a persistent storage to store the one or more device states persistently; a software update manager to receive a software update configuration at the service delivery platform; a software update file storage to receive one or more software update files at the service delivery platform associated with the software update configuration; and the software update manager to determine a candidate device list utilizing the software update configuration and the information contained in the one or more device states, the candidate device list containing references to one or more targeted devices, of the one or more devices, targeted to receive a software update associated with the software update configuration.

FIG. 1 is a schematic representation of a system for distributed software updates. The example system 100 may include a service delivery platform 102. The service delivery platform 102 may be implemented using a network accessible server based (a.k.a. cloud-based) architecture. The service delivery platform may include a single server, multiple co-located servers, multiple distributed servers, one or more tenancies on one or more multi-tenant servers, other similar architectures for providing network accessible services, and combinations of these architectures. The service delivery platform 102 may include the one or more device states (110A and 110B), a software update manager 114 and software update file storage 118.

The service delivery platform 102 may be located in a network environment 124 such as, for example, a public network (e.g. the Internet, a.k.a. the World Wide Web), a private network (e.g. a corporate intranet), a virtual private network (VPN) or a combination of one or more of these. The service delivery platform 102 may provide data communication connectivity between a device update controller 104 and a plurality of devices (106A and 106B). The plurality of devices may be referenced as one or more devices 106. Each of the one or more devices 106 may be a whole or a portion of a machine with data communication capability. The machines may include, for example, mobile devices (e.g. smart phone, computing tablets, and media players), vehicles (e.g. automobiles, commercial transport vehicles, aircraft, and watercraft), domestic appliances (e.g. washing machines, refrigerators, stoves, and coffee makers), industrial equipment (e.g. wind turbines) and sensor equipped machines (e.g. thermostats, rainfall gauge, wind speed indicator). Each device 106 may include one or more of computing capability, data storage, sensors, state objects, access permissions, authentication mechanism, data encryption mechanism and other similar functions and capabilities. In addition to data communication connectivity with the devices 106, the service delivery platform 102 may also provide for connectivity with other networks 122 and other service delivery platforms (not illustrated).

Each device 106 may include one or more computing components (108A and 108B) that may be referred to as the computing components 108. Each computing component 108 may provide a subset of the functionality of the device 106. The computing components 108 may include, for example, an airbag module, a heating, ventilation and air conditioning system (HVAC) module and a navigation module in an automobile. In another example, the computing components 108 may include a touch controller, a cellular radio controller and a main processor in a mobile phone device. Each of the computing components 108 may be repaired, replaced or upgraded over time. For example, an automobile may have the airbag module replaced with a different airbag module from a different manufacturer. Each device 106 and/or each computing component 108 may be controlled by software executing on an associated processor. Each computing component 108 may execute different software that is distinct or separate from software executed other computing components 108 of the device 106. The software may be stored in one or more data storages. In one alternative, the one or more computing components 108 within a device 106 may execute software utilizing a virtual machine on a shared processing unit. The software executing on each of the one or more computing components 108 included in a device 106 may be individually (e.g. separately) version controlled and may be independently updated.

One or more devices 106 may be of similar type, for example, device type A 106A may include a group of similar type automobiles or a group of similar type refrigerators. Each device type A 106A may include one or more components 108A. The software executing on each of the one or more device type A 106A and/or one or more components 108A may be different. The software may be a different version depending on when the device 106 was manufactured or when the device last received a software update. Each device type A 106A may be of similar device type but may perform differently depending on the software version being executed. Multiple devices of similar device types (e.g. device type A 106A or device type B 106B) may communicate with the service delivery platform 102.

Each of the one or more devices 106 may communicate one or more device states (110A and 110B), or device state objects, associated with the respective one or more devices 106 to the service delivery platform 102. The one or more device states (110A and 110B) may be referenced as one or more device states 110. The service delivery platform 102 may be non-co-located with, or separate from, the one or more devices 106. Each of the one or more device states 110 may include software version information, or version information, and/or hardware version information associated with each of the one or more devices 106. The device state may also include information, such as, device or component characteristics pertaining to any of resource capability, location information, usage information, error conditions, user configurations, and other similar characteristics. The hardware version information may include, for example, manufacture date, unique hardware identifiers, hardware version number and manufacturer. The unique hardware identifiers may include, for example, media access control (MAC) address and/or vehicle identification number (VIN). The one or more device states 110 may include other information such as, for example, current location, on/off status and error status. Each of the one or more device states 110 may additionally include one or more computing component states (112A and 112B). The one or more computing component states (112A and 112B) may be referenced as one or more computing component states 112. Each of the one or more computing component states 112 may include version information associated with the respective one or more computing components 108 similar to the version information described herein with regard to the devices 106.

The service delivery platform 102 may store a persistent copy of each of the one or more device states 110. Each of the one or more devices 106 may communicate its device state 110 to the service delivery platform 102 via a communications network 124. Each of the one or more devices 106 may initiate the communication of its device state 110 to the service delivery platform 102 (a.k.a. pushing the device state). The device state 110 may be communicated to the service delivery platform 102 when, for example, information contained within the device state 110 changes, the device 106 has connectivity or the service delivery platform 102 requests an device state update. The service delivery platform 102 stores each of the one or more device states 110 independent of (e.g. irrespective of) whether the associated device 106 may be powered off or has no connectivity to the service delivery platform 102.

The device update controller 104 may create and distribute a software update destined to be applied to one or more of the devices 106. The distributed software update may include a software update configuration 116 and software update files (120A and 120B) that may be communicated to the service delivery platform 102. The one or more software update files (120A and 120B) may be referenced as the one or more software update files 120. The software update configuration 116 may be used to determine which of the one or more software update files 120 may be applied to each of the one or more devices 106 and the one or more computing components 108. In one alternative, the manufacturer of the one or more devices 106 may, for example, control the device update controller 104.

The software update manager 114 may receive the software update configuration 116 from the device update controller 104. The software update file storage 118 may receive the software update files 120 from the device update controller 104. The software update manager 114 and the software update file storage 118 may receive one or more different software updates from the same and/or different device update controllers 104.

Each software update configuration 116 may be used to determine which of the one or more software update files 120 may be applied to each of one or more devices 106 and/or one or more computing components 108. The determined one or more devices 106 and/or one or more computing components 108 are included in the candidate device list 124. The software update configuration 116 may further be used to determine which of the one or more software update files 120 may be applied to a combination of each of the one or more devices 106 and the one or more computing components 108 based on associated version information. For example, the software update configuration 116 may define an available software update for component 1 version A when component 2 has version A but not when component 2 has version B. The software update configuration 116 may specify which of the one or more software update files 120 may be applied to a combination of each of the one or more devices 106 and/or the one or more computing components 108 based on other information such as, for example, location. For example, an automobile engine may be controlled using a software program with one or more associated control parameters that may be set differently based on, for example, geographic location, external temperature and humidity, and calendar date. An automobile driving from a cold climate to a warm climate may receive software updates as it travels from the cold climate to the warm climate.

The software update manager 114 may be triggered to perform the distributed software update when the device update controller 104 communicates the software update configuration 116 and the associated software update files 120. The software update manager 114 may determine a candidate device list 124, that includes devices 106 and/or computing components 108 targeted to receive the software update, utilizing the software update configuration 116 and version information contained in the one or more device states 110. The software update manager 114 may examine each of the relevant device states 110 as specified in the software update configuration 116 one by one (e.g. individually). The software update configuration 116 may specify that the distributed software update may be applied, for example, to devices of type A 106A. In this example, the software update manager 114 may examine the states 110A of each of the one or more devices of type A 106A one by one to determine which particular devices of the devices of type A 106A should be targeted to receive the software update.

The software update configuration 116 may specify that the distributed software update may be applied to one or more computing components 108. The software update manager 114 may examine each of the relevant device states 110 and the relevant computing component states 112 in order to determine the candidate device list 124. The candidate device list 124 may contain a reference to one or more targeted devices, of the one or more devices 106, targeted to receive the software update. The candidate device list 124 may also contain a reference to the one or more software update files 120 to apply to each of the one or more targeted devices. The candidate device list 124 may also contain a reference to one or more targeted computing components, of the one or more computing components 108, targeted to receive the software update. The candidate device list 124 may also contain a reference to the one or more software update files 120 to apply to each of the one or more targeted computing components.

The software update manager 114 may determine the candidate device list 124 while executing on the service delivery platform 102 without the need for communication with each of the one or more devices 106. Given that each of the one or more devices states 110 may be stored persistently within the service delivery platform 102, the software update manager 114 may not need to be in communication with each of the one or more devices 106 during derivation of the candidate device list 124.

The software update manager 114 may communicate with each of the one or more targeted devices indicating that a software update is available. The one or more devices 106 that are not targeted for a software update may receive no communication from the software update manager 114 thereby mitigating unnecessary communication between the service delivery platform 102 and each of the one or more devices 106. In one example, the software update manager 114 may communicate with each of the one or more targeted devices by sending a message. In another example, the software update manager 114 may communicate with each of the one or more targeted devices when the targeted device sends a message querying if a software update is available in the form of a response. Each of the one or more software update files 120 referenced in the candidate device list 124 may be transmitted to the associated one or more devices 106. Each of the one or more software update files 120 may be sent from the service delivery platform 102 or downloaded from the service delivery platform 102 by each of the one or more targeted devices. Alternatively, or in addition, the software update manager 114 may provide the target devices with a link (e.g. a universal resource locator (URL)) that may be used to obtain the software update files 120.

Each of the one or more device states 110 and each of the one or more associated computing component states 112 may contain version information. The software update manager 114 may determine the candidate device list 124 utilizing the version information associated with each of the one or more device states 110 and/or computing component states 112. In one alternative, the version information associated with each of the one or more device states 110 and/or computing component states 112 may be represented as a single number for each of the one or more device states 110. Version information may be represented as a single number utilizing, for example, a hashing function. The single number may be also known as a hash value, hash code or hash. The single number (e.g. hash value) may represent a composite of state information 110 for a device together with state information 112 for one or more computing components associated with the device 106. The hashing function may generate a unique single number (e.g. hash value) for each distinct combination of device and computing component states. The software update manager 114 may determine the candidate device list 124 utilizing the single number representing the version information, or hashed version information by comparing a single number associated with versions information for each device (including computing component version information) with a single number associated with version information contained in the software update configuration 116. The hashed version information represented as a single number may allow the software update manager 114 to determine the candidate device list 124 in a shorter amount of time (e.g. using less computing resources) compared to not using the hashed version information. One example hashing function may alphabetically sort the device and component names and then hash the names with the associated version numbers creating a single number representing the version information, or version hash. The version hash may, for example, be 128-bits in length. In addition, the hashed version information may be utilized to perform analytics of software distributions. The analytics may be used, for example, for determining characterizations of situations where a device may have multiple components with different software versions or different components between devices, and can be used to identify software distribution patterns or combination of components and component versions that are deployed within a device population. The analytics may also be used to determine locality or geographic distribution of particular hardware and/or software versions. Received device state characteristics may also be utilized in determining updates applicable to particular device or combination of components.

Each of the one or more software update files 120 may be digitally signed or encrypted. Each of the one or more software update files 120 may be represented by a file identifier, or FileID, and located by a uniform resource locator, or URL. The FileID and the URL of each one or more associated software update files 120 may be communicated by the services delivery platform 102 to each of the one or more targeted devices. The FileID and the URL may allow the transmission of each of the one or more software update files 120 to each of the one or more targeted devices. The transmission may utilize a defined protocol format including, for example, Hypertext Transfer Protocol Secure, or HTTPS.

FIG. 2 is a representation of a method for distributed software updates. The method 200 may be, for example, implemented using the systems 100 and 300 described herein with reference to FIGS. 1 and 3. The method 200 may include the following acts. Receiving one or more device states associated with the one or more devices at a service delivery platform separate from the one or more devices where each of the one or more device states includes version information 202. The device state may be communicated to the service delivery platform when, for example, information contained within the device state changes, the device has connectivity or the service delivery platform requests a device state update. Storing the one or more device states persistently 204. The service delivery platform may access the device states when the associated device may not have connectivity to the service delivery platform. Receiving a software update configuration at the service delivery platform 206. The software update manager 114 may receive the software update configuration 116. Receiving one or more software update files at the service delivery platform associated with the software update configuration 208. The software update file storage 118 may receive and store the one or more software update files 120. Determining a candidate device list utilizing the software update configuration and the information contained in the one or more device states, the candidate device list containing references to one or more targeted devices, of the one or more devices, targeted to receive the software update 210. The software update manager 114 may examine each of the relevant device states 110 as specified in the software update configuration 116 one by one without the need for communication with each of the one or more devices 106.

The method 200 may further include the following acts. The software update manager 114 may communicate with each of the one or more targeted devices indicating that a software update is available. The software update manager 114 may communicate with each of the one or more targeted devices by sending a message. Alternatively, the software update manager 114 may communicate with each of the one or more targeted devices when the targeted device sends a message querying if a software update is available in the form of a response. Each of the one or more software update files 120 referenced in the candidate device list 124 may be transmitted to the associated one or more devices 106. Each of the one or more software update files 120 may be sent from the service delivery platform 102 or downloaded from the service delivery platform 102 by each of the one or more targeted devices. Each of the one or more targeted devices may apply one or more software updates, including updates to associated computing components, using the one or more software update files 120.

Figure 3:
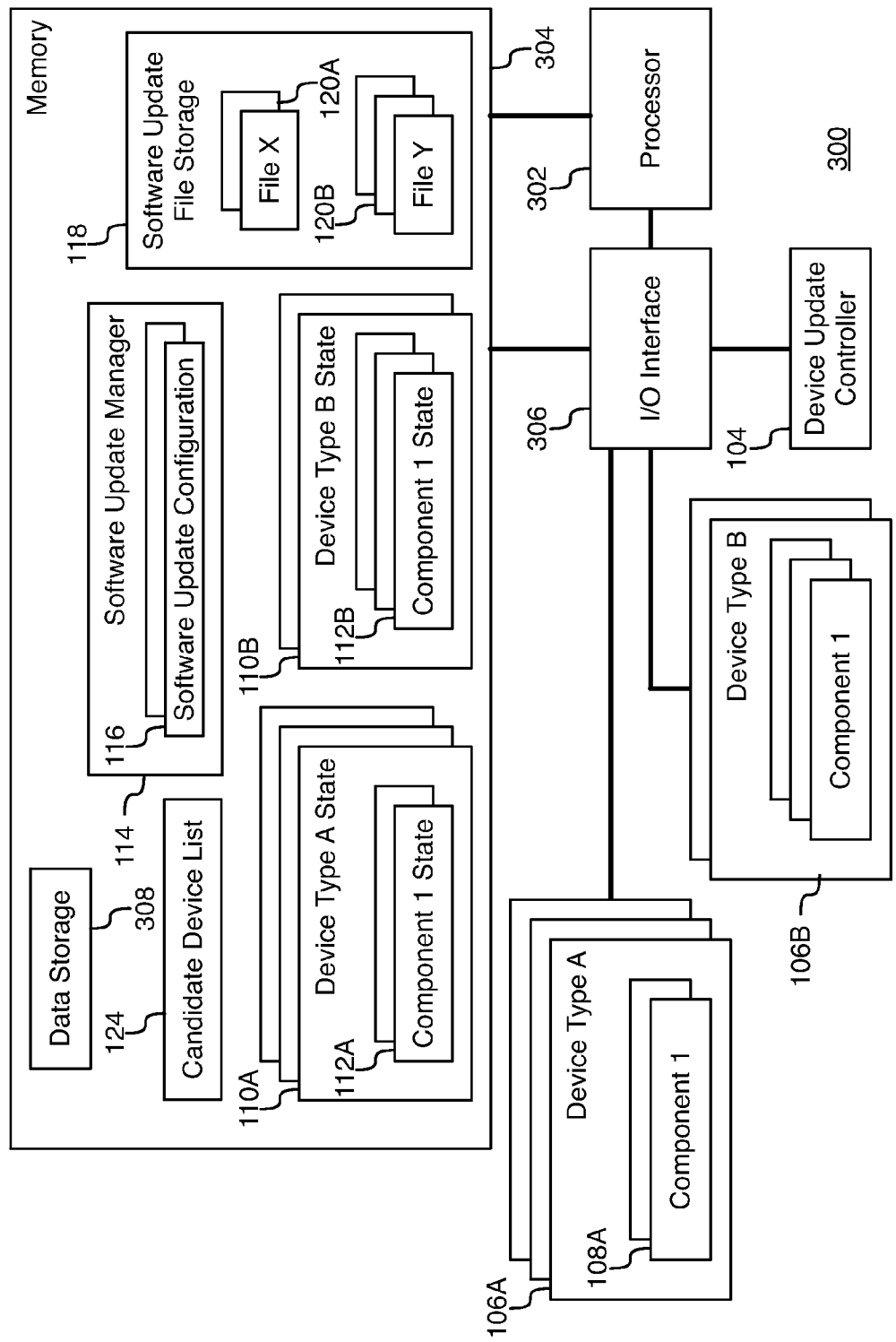
FIG. 3 is a further schematic representation of a system for distributing software updates.

FIG. 3 is a schematic representation of a system for distributed software updates. The system 300 comprises a processor 302; memory 304 (the contents of which are accessible by the processor 302) and an I/O interface 306. The memory 304 may store instructions which when executed using the processor 302 may cause the system 300 to render the functionality associated with the service delivery platform 102 and its components as described herein. In addition the memory 304 may store device states 110, computing component states 112, software update files 120, a software update file storage 118, software update configurations 116, a software update manager 114, candidate device lists 124 and other similar information.

The processor 302 may comprise a single processor or multiple processors that may be disposed on a single chip, on multiple devices or distributed over more than one system. The processor 302 may be hardware that executes computer executable instructions or computer code embodied in the memory 304 or in other memory to perform one or more features of the system. The processor 302 may include a general purpose processor, a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 304 may comprise a device for storing and retrieving data, processor executable instructions, or any combination thereof. The memory 304 may include non-volatile and/or volatile memory, such as a random access memory (RAM), a read-only memory (ROM), an erasable programmable read-only memory (EPROM), or a flash memory. The memory 304 may comprise a single device or multiple devices that may be disposed on one or more dedicated memory devices or on a processor or other similar device. Alternatively or in addition, the memory 304 may include an optical, magnetic (hard-drive) or any other form of data storage device.

The memory 304 may store computer code, such as, for example, computer code to render the functions of service delivery platform 102, the software update manager 114 and the software update file storage 118 as described herein. The computer code may include instructions executable with the processor 302. The computer code may be written in any computer language, such as C, C++, assembly language, channel program code, and/or any combination of computer languages. The memory 304 may store information in data structures including, for example, information in data structures including device states, computing component states and other similar information. The data structures may be stored in the data storage 308.

The I/O interface 306 may be used to connect devices such as, for example, devices 106, device update controller 104, and to other components of the system 300.

All of the disclosure, regardless of the particular implementation described, is exemplary in nature, rather than limiting. The systems 100 and 300 may include more, fewer, or different components than illustrated in FIGS. 1 and 3. Furthermore, each one of the components of systems 100 and 300 may include more, fewer, or different elements than is illustrated in FIGS. 1 and 3. Flags, data, databases, tables, entities, and other data structures may be separately stored and managed, may be incorporated into a single memory or database, may be distributed, or may be logically and physically organized in many different ways. The components may operate independently or be part of a same program or hardware. The components may be resident on separate hardware, such as separate removable circuit boards, or share common hardware, such as a same memory and processor for implementing instructions from the memory. Programs may be parts of a single program, separate programs, or distributed across several memories and processors.

The functions, acts or tasks illustrated in the figures or described may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, distributed processing, and/or any other type of processing. In one embodiment, the instructions are stored on a removable media device for reading by local or remote systems. In other embodiments, the logic or instructions are stored in a remote location for transfer through a computer network or over telephone lines. In yet other embodiments, the logic or instructions may be stored within a given computer such as, for example, a CPU.

While various embodiments of the system and method for distributed software updates have been described, it will be apparent to those of ordinary skill in the art that many more embodiments and implementations are possible within the scope of the present invention. Accordingly, the invention is not to be restricted except in light of the attached claims and their equivalents.

The invention claimed is:

1. A method for distributing software updates to a plurality of devices comprising:
   receiving at a service delivery platform, a plurality of single number hashed hardware version information, wherein each single number hashed hardware version information is associated with a respective one of the plurality of devices, that are separate from the service delivery platform, the single number hashed hardware version information providing a composite identifier associated with one or more device states, of its respective one of the plurality of device, which includes hardware version information and a plurality of computing component states associated with a plurality of computing components each contained in the respective one of the plurality of devices, each of the plurality of associated computing component states includes hardware version information;
   receiving a software update configuration at the service delivery platform, the software update configuration defining available software update files and hardware versions to be applied to a device or computing component and relevant device states and computing component states for applying the respective software update;
   receiving one or more software update files at the service delivery platform associated with the software update configuration;
   determining a candidate device list utilizing the software update configuration and the single number hashed hardware version information for each of the one of the plurality of devices, the candidate device list containing references to one or more targeted devices of the plurality of devices and associated plurality of computing components, and reference to one or more software update files to apply to each of the one or more targeted devices and associated plurality of computing components targeted to receive one or more of the one or more software update files by comparing the single number hashed version information for each of the one of the plurality of devices with a single number associated with version information for each device including hardware component version information, hardware states, computing component version information, and associated computing state information and version information contained in the software update configuration; and
   transmitting each of the one or more software update files referenced in the candidate device list to the determined one or more targeted devices to be installed.

2. The method for distributing software updates to the plurality of devices of claim 1, further comprising:
   communicating with each of the one or more targeted devices an availability of one or more software update files; and transmitting each of the one or more software update files referenced in the candidate device list to the associated one or more targeted devices.

3. The method for distributing software updates to the plurality of devices of claim 1, where each of the one or more software update files may be digitally signed or encrypted.

4. The method for distributing software updates to the plurality of devices of claim 1, where each of the one or more software update files may be represented using a file identifier and located using a uniform resource locator.

5. The method for distributing software updates to the plurality of devices of claim 2, where availability of the one or more software update files are communicated by a software update platform.

6. A service delivery platform for distributing software updates to a plurality of devices comprising:
   a processor; and
   a memory coupled to the processor containing instructions which configure the processor to:
   receive a plurality of single number hashed hardware version information, wherein each single number hashed hardware version information is associated with a respective one of the plurality of devices, that are separate from the service delivery platform, the single number hashed hardware version information providing a composite identifier associated with one or more device states, of its respective one of the plurality of device, which includes hardware version information and plurality of component states associated with a plurality of computing components each contained in the respective one of the plurality of devices, and each of the plurality of computing component states also includes hardware version information;
   receive a software update configuration at the service delivery platform, the software update configuration defines available software update files and hardware versions to be applied for a device or computing component and relevant device states and computing component states for applying the respective software update file;
   receive one or more software update files at the service delivery platform associated with the software update configuration; and
   determine a candidate device list utilizing the software update configuration and the single number hashed hardware version information for each of the one of the plurality of devices, the candidate device list containing references to one or more targeted devices of the plurality of devices and associated plurality of computing components and references to one or more software update files to apply to each of the one or more targeted devices and associated plurality of computing components targeted to receive the one or more software update files by comparing the single number hashed version information for each of the one or the plurality of devices with a single number associated with version information for each device including hardware component version information, hardware states, computing component version information, and associated computing state information and version information contained in the software update configuration, and transmitting each of the one or more software update files references in the candidate device list to the determined one or more targeted devices to be installed.

7. The service delivery platform for distributing software updates to the plurality of devices of claim 6, where each of the one or more software update files may be digitally signed or encrypted.

8. The service delivery platform for distributing software updates to the plurality of devices of claim 6, where each of the one or more software update files may be represented using a file identifier and located using a uniform resource locator.

9. The service delivery platform for distributing software updates to the plurality of devices of claim 6, where availability of the one or more software update files are communicated by a software update platform.

10. The service delivery platform for distributing software updates to the plurality of devices of claim 6 wherein determining the candidate device list further comprises using one or more associated control parameters associated with the device to select the one or more software update files.

11. The service delivery platform for distributing software updates to the plurality of devices of claim 10 wherein the one or more associated control parameters is based on geographic location, external temperature and humidity or calendar date.

12. The method for distributing software updates to the plurality of devices of claim 1, wherein determining the candidate device list further comprises using one or more associated control parameters associated with the device to select the one or more software update files.

13. The method for distributing software updates to the plurality of devices of claim 12, wherein the control parameter is based on geographic location, external temperature and humidity or calendar date.

* * * * *